(12) United States Patent
Seidl et al.

(10) Patent No.: US 9,007,430 B2
(45) Date of Patent: Apr. 14, 2015

(54) SYSTEM AND METHOD FOR CREATING A NAVIGABLE, THREE-DIMENSIONAL VIRTUAL REALITY ENVIRONMENT HAVING ULTRA-WIDE FIELD OF VIEW

(71) Applicants: Thomas Seidl, Haiku, HI (US); Ron Igra, Haiku, HI (US)

(72) Inventors: Thomas Seidl, Haiku, HI (US); Ron Igra, Haiku, HI (US)

( * ) Notice: Subject to any disclaimer, the term of this patent is extended or adjusted under 35 U.S.C. 154(b) by 0 days.

(21) Appl. No.: 14/090,132

(22) Filed: Nov. 26, 2013

(65) Prior Publication Data

US 2014/0098186 A1 Apr. 10, 2014
US 2015/0054912 A9 Feb. 26, 2015

Related U.S. Application Data

(63) Continuation of application No. PCT/US2012/039572, filed on May 25, 2012.

(60) Provisional application No. 61/490,656, filed on May 27, 2011.

(51) Int. Cl.
| | | |
|---|---|---|
| *H04N 13/04* | (2006.01) | |
| *H04N 13/00* | (2006.01) | |
| *H04N 13/02* | (2006.01) | |

(Continued)

(52) U.S. Cl.
CPC ............ *H04N 13/044* (2013.01); *H04N 13/04* (2013.01); *H04N 13/0014* (2013.01); *H04N 13/0239* (2013.01); *H04N 13/0242* (2013.01); *H04N 13/0484* (2013.01); *G06T 15/10* (2013.01); *G06T 2215/08* (2013.01); *G06F 3/011* (2013.01)

(58) Field of Classification Search
CPC . H04N 13/044; H04N 13/04; H04N 13/0239; H04N 13/0242; H04N 13/0484; H04N 13/0014; G06T 15/10; G06T 2215/08; G06F 3/011
USPC ..................................................... 348/36–42
See application file for complete search history.

(56) References Cited

U.S. PATENT DOCUMENTS

| | | |
|---|---|---|
| 5,960,108 A | 9/1999 | Xiong |
| 6,005,611 A | 12/1999 | Gullichsen et al. |
| 6,346,967 B1 | 2/2002 | Gullichsen et al. |

(Continued)

FOREIGN PATENT DOCUMENTS

JP 2010256534 11/2010

OTHER PUBLICATIONS

Shoot Tools: 21st Century, www.creativeplanenetwork.com/node/15860, Mar. 13, 2014.

(Continued)

*Primary Examiner* — Tung Vo
(74) *Attorney, Agent, or Firm* — Niels Haun; Dann Dorfman Herrell & Skillman, PC

(57) ABSTRACT

The present invention relates to a system and method for capturing video of a real-world scene over a field of view that may exceed the field of view of a user, manipulating the captured video, and then stereoscopically displaying the manipulated image to the user in a head mounted display to create a virtual environment having length, width, and depth in the image. By capturing and manipulating video for a field of view that exceeds the field of view of the user, the system and method can quickly respond to movement by the user to update the display allowing the user to look and pan around, i.e., navigate, inside the three-dimensional virtual environment.

14 Claims, 6 Drawing Sheets

(51) Int. Cl.
  *G06T 15/10* (2011.01)
  *G06F 3/01* (2006.01)

(56) References Cited

U.S. PATENT DOCUMENTS

| | | | |
|---|---|---|---|
| 6,891,518 | B2 | 5/2005 | Sauer et al. |
| 7,365,793 | B2 | 4/2008 | Cheatle et al. |
| 2002/0036649 | A1* | 3/2002 | Kim et al. ............ 345/633 |
| 2007/0182812 | A1* | 8/2007 | Ritchey ............ 348/36 |
| 2008/0024594 | A1* | 1/2008 | Ritchey ............ 348/36 |
| 2008/0030573 | A1* | 2/2008 | Ritchey ............ 348/36 |
| 2008/0174659 | A1 | 7/2008 | McDowall |
| 2009/0009522 | A1 | 1/2009 | Endo |
| 2010/0045773 | A1* | 2/2010 | Ritchey ............ 348/36 |
| 2010/0259619 | A1 | 10/2010 | Nicholson |
| 2011/0112934 | A1 | 5/2011 | Ishihara |
| 2012/0113209 | A1* | 5/2012 | Ritchey et al. ............ 348/14.02 |
| 2013/0063550 | A1* | 3/2013 | Ritchey et al. ............ 348/36 |

OTHER PUBLICATIONS

You Tube Video, "Shoot 3D Now!", http://www.youtube.com/watch?v=gJlkuHxQB20, Nov. 13, 2009.
You Tube Video, Youtube 3D Camera Setup (yt3d:enable=true), http://www.youtube.com/watch?v=nduOEmCxJrg&feature=related, Aug. 2, 2009.
The Innovative New 3D Tech Behind James Cameron's Avatar, 0http://www.foxnews.com/tech/2009/12/11/innovative-new-d-tech-james-camerons-avatar/, Dec. 11, 2009.
International Search Report dated Dec. 20, 2012 corresponding to PCT/US2012/039572.
Written Opinion dated Dec. 20, 2012 corresponding to PCT/US2012/039572.
International Preliminary Report on Patentability dated Dec. 12, 2013 corresponding to PCT/US2012/039572.
Ryubin's Panorama Laboratory, http://www.ryubin.com/panolab/panoflash/projects_spherecam_experiment01.html#screen, Dec. 14, 2009.

* cited by examiner

SYSTEM AND METHOD FOR CREATING A NAVIGABLE, THREE-DIMENSIONAL VIRTUAL REALITY ENVIRONMENT HAVING ULTRA-WIDE FIELD OF VIEW

RELATED APPLICATIONS

This application is a continuation of International Application No. PCT/US2012/039572, filed May 25, 2012, which claims priority to U.S Provisional Application No. 61/490,656, filed May 27, 2011. Each of the foregoing applications is incorporated herein by reference.

FIELD OF THE INVENTION

The present invention relates generally to systems and methods for creating a navigable, panoramic three-dimensional environment of a real-world scene, and more particularly, but not exclusively, to capturing video images that extend beyond the field of view of a user and manipulating the images to create a navigable, panoramic three-dimensional virtual reality environment in a head mounted display that permits the user to control the direction they look in the recorded real world environment.

BACKGROUND OF THE INVENTION

Existing three-dimensional image capture systems may capture images of limited field of view using two cameras mounted side by side and display these two images separately into each eye of a user by various means. Since the field of view of the originally captured images is limited, such systems do not readily permit the user to turn their head, for example 90° to the left or right, to see what is to the left or right of the originally captured images in the real-world scene. However, capturing video data of wide field of view images poses a number of difficulties which must be overcome in order to present the images to the user in a manner that accurately reflects the real-world scene and the user's movement relative to the real-world scene. Hence, it would be an advance in the state of the art to provide a system and method for creating a navigable, panoramic three-dimensional virtual reality environment of a real-world scene that permits the user to move around inside the environment.

SUMMARY OF THE INVENTION

In one of its aspects, the present invention relates to systems and methods for creating a navigable, panoramic three-dimensional virtual reality environment in which stereoscopic perception of three-dimensional depth to a user is achieved. (As used herein, a "three-dimensional virtual reality environment" is defined to be one in which stereoscopic perception of three-dimensional depth can be perceived by a user, e.g., as in a 3-D TV.) In this regard, the systems and methods may provide for the recording of a real-world scene of up to a full 360° by 360° field of view in three dimensions, manipulating the recorded images, and then displaying the images to a person using a head mounted display with a tracking device.

For example, the present invention may provide a system for creating a navigable, panoramic three-dimensional virtual reality environment, comprising a wide field of view optical imaging device having at least two optical imaging elements configured to image at least two different viewpoints of a scene. (As used herein, the term "wide field of view" is defined to mean a field of view having a full angle greater than 75 degrees in a vertical direction and at the same time having a full angle greater than 170 degrees in the horizontal direction.) The optical imaging device may include a fisheye lens and/or a mirror, for example. The optical imaging device may include at least one optical imaging detector configured to record first and second video image data of the different viewpoints of the scene, respectively. For example, the optical imaging device may be configured to alternately display the images of the at least two different view points on the optical imaging detector to provide the first and second video image data. Alternatively, a separate optical imaging detector may provided for each respective optical imaging element.

In addition, the system may include a tracking device configured to track the movement of a user, and a position detector disposed in communication with the tracking device to receive tracking data from the tracking device and configured to determine a direction of view of the user. An image renderer may be provided and disposed in communication with the optical imaging device to receive the first and second video image data. The image renderer may also be disposed in communication with the position detector to receive the direction of view, and may be configured to compute respective regions of interest of a portion of the first and second video image data based on the user's direction of view. A head mounted display may be disposed in communication with the image renderer to receive image data associated with the respective regions of interest and may be configured to display the image data associated with the respective regions of interest the user, whereby a navigable, panoramic three-dimensional virtual reality environment is created.

In one of its configurations, the renderer may include a computer usable medium having a computer readable program code embodied therein. The computer readable program code may be adapted to be executed to implement a method for rendering the first and second video image data to create a navigable, panoramic three-dimensional virtual reality environment. The method may also include the steps of creating first and second wireframe spheres, and transforming each of the first and second video images by wrapping the first and second video data onto the first and second wireframe spheres respectively.

In another of its aspects, the present invention may provide a computer usable medium comprising a computer readable program code embodied therein. The computer readable program code may be adapted to be executed to implement a method for rendering video image data to create a navigable, panoramic three-dimensional virtual reality environment. The method may include the steps of receiving video image data of a scene having a wide field of view comprising first and second video image streams taken from different viewpoints. The first video image stream may have a plurality of first image frames and the second video image stream may have a plurality of second image frames. The method may synchronize the respective pairs of the first and second image frames to create a video output stream of the synchronized image pairs. For example, the synchronization may be performed by merging respective pairs of the first and second image frames to create a video output stream of the merged image pairs. The step of synchronizing respective pairs of the first and second image frames may also include removing distortion from the first and second image frames.

The method may also include receiving position data indicating a direction of sight of a user, calculating a first and second region of interest of the respective first and second image frames based on the position data, and displaying the first and second regions of interest on a stereoscopic display, whereby a navigable three-dimensional virtual reality environment is created of the recorded real world environment.

The method may also create first and second wireframe spheres and wrap a respective first and second section of the synchronized or merged image pairs onto the respective first and second wireframe spheres. In addition, the method may receive position data indicating a direction of sight of a user and calculate a first and second region of interest of the respective first and second wireframe spheres based on the position data. The first and second regions of interest may be displayed on a stereoscopic display, The step of displaying the first and second regions of interest may include rotating the first and second wireframe spheres in response to the position data.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
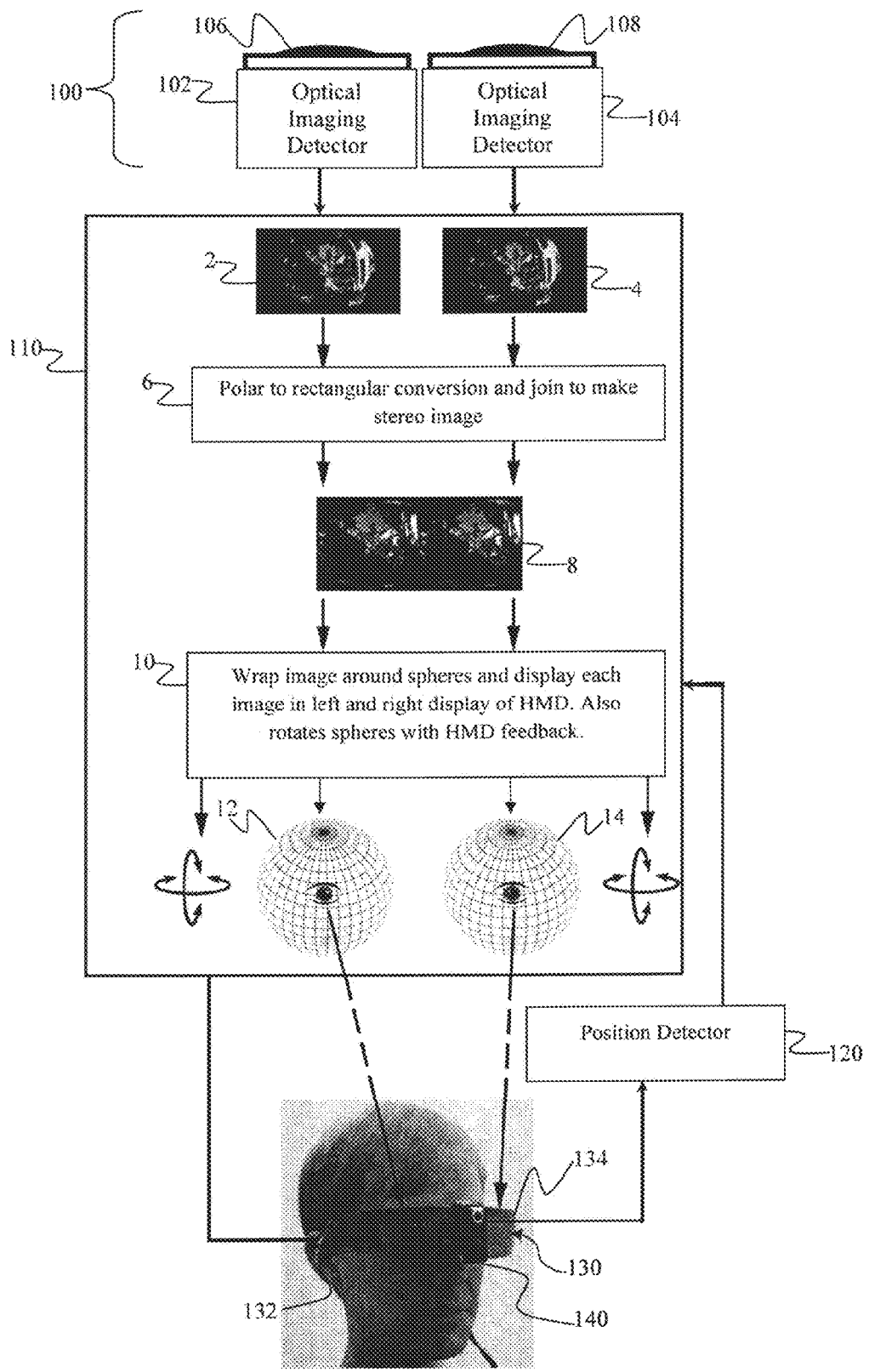
FIG. 1 schematically illustrates an exemplary system for creating a navigable, panoramic three-dimensional virtual reality environment in accordance with the present invention.
Figure 2A:
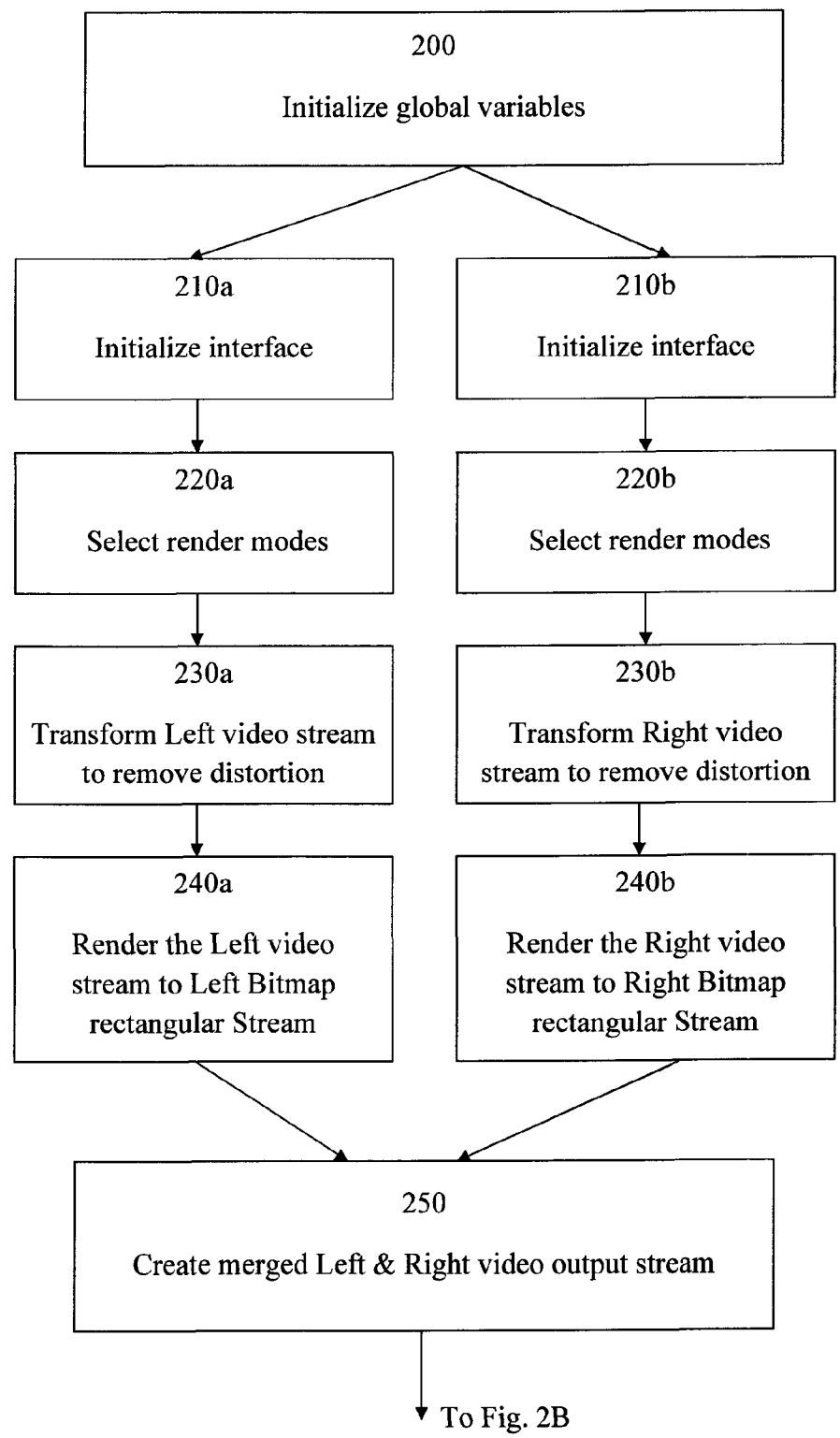
FIGS. 2A, 2B schematically illustrate an exemplary method for creating a navigable, panoramic three-dimensional virtual reality environment in accordance with the present invention.
Figure 2B:
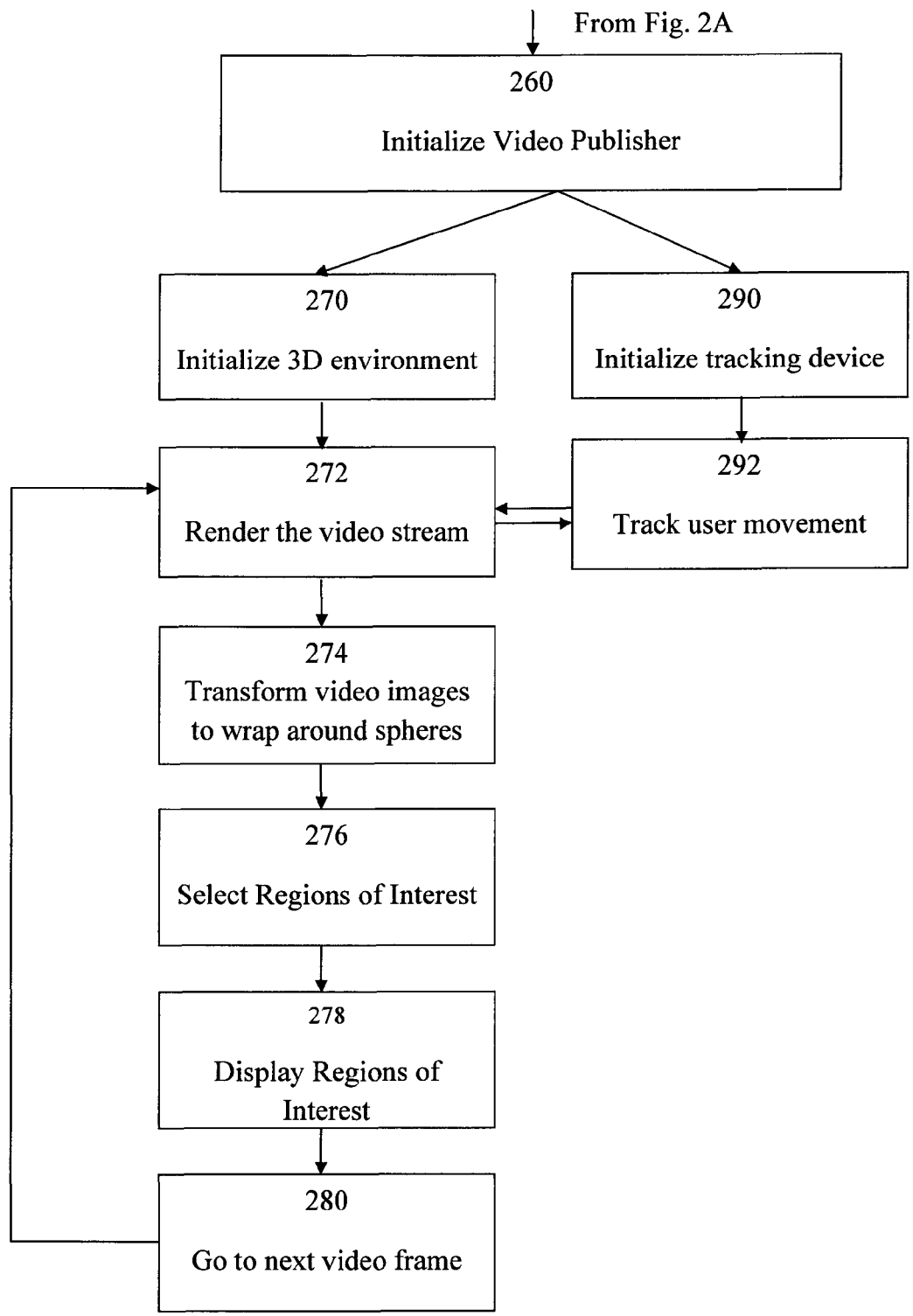

Referring now to the figures, wherein like elements are numbered alike throughout, the present invention relates to systems and methods for creating a navigable, panoramic three-dimensional virtual reality environment having an ultra-wide field of view, FIGS. 1, 2A, 2B. For example, in one of its aspects, the systems and methods provide a navigable, panoramic three-dimensional virtual reality environment by capturing video image data of a scene having a wide field of view. By capturing video data of a scene that extends beyond the field of view of a user and storing and transforming that video data, the systems and methods of the present invention can create a navigable, panoramic three-dimensional virtual reality environment that can rapidly render and present to the user video information of new portions of the scene that come into the user's view as the user moves their head. As a result, the user gets the feeling of being inside a virtual environment, being able to perceive depth and pan and zoom, due to the manipulation and display of the video image data by the system and method of the present invention.

Figure 3A:
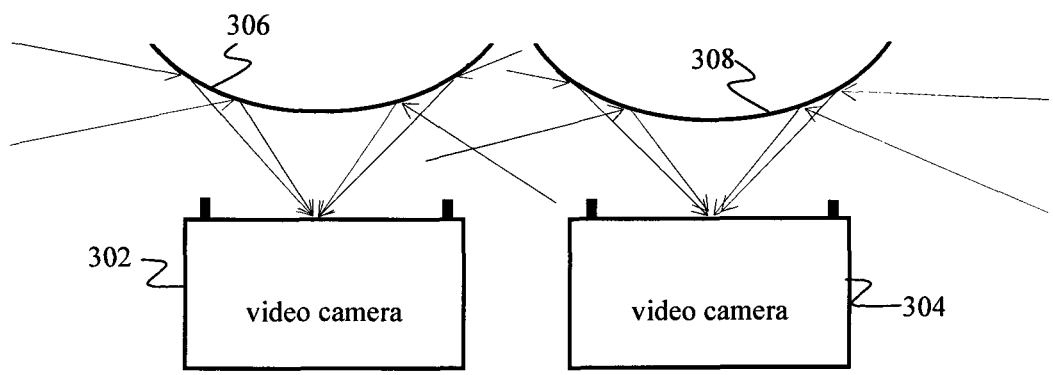
FIGS. 3A-3D schematically illustrate exemplary configurations for optical imaging devices used in the present invention, with FIGS. 3A, 3B showing side elevational and top views, respectively, of a mirror system, FIG. 3C showing a top view of a lens system have forward and rearward pairs of imaging devices, and FIG. 3D showing a top view of a hexagonally configured system having six imaging devices.
Figure 3B:
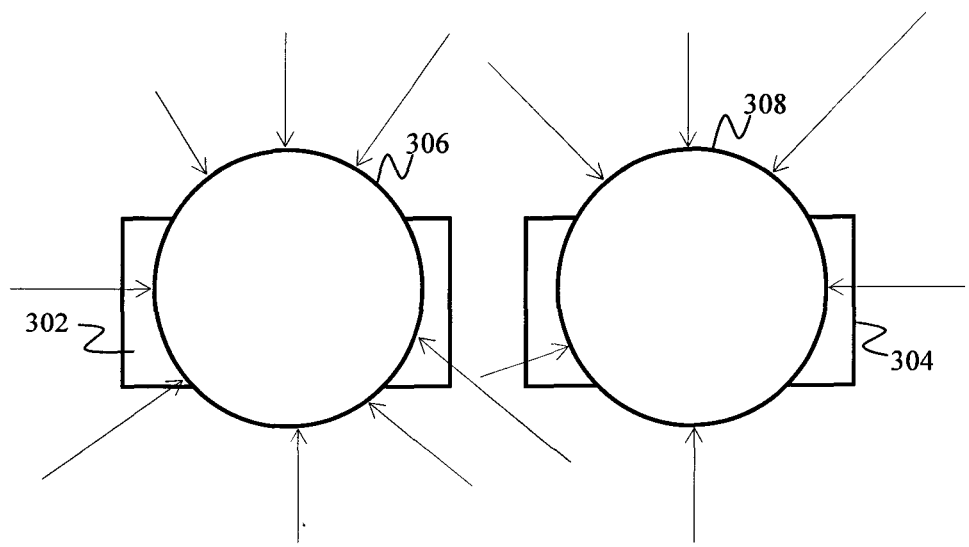
Figure 3C:
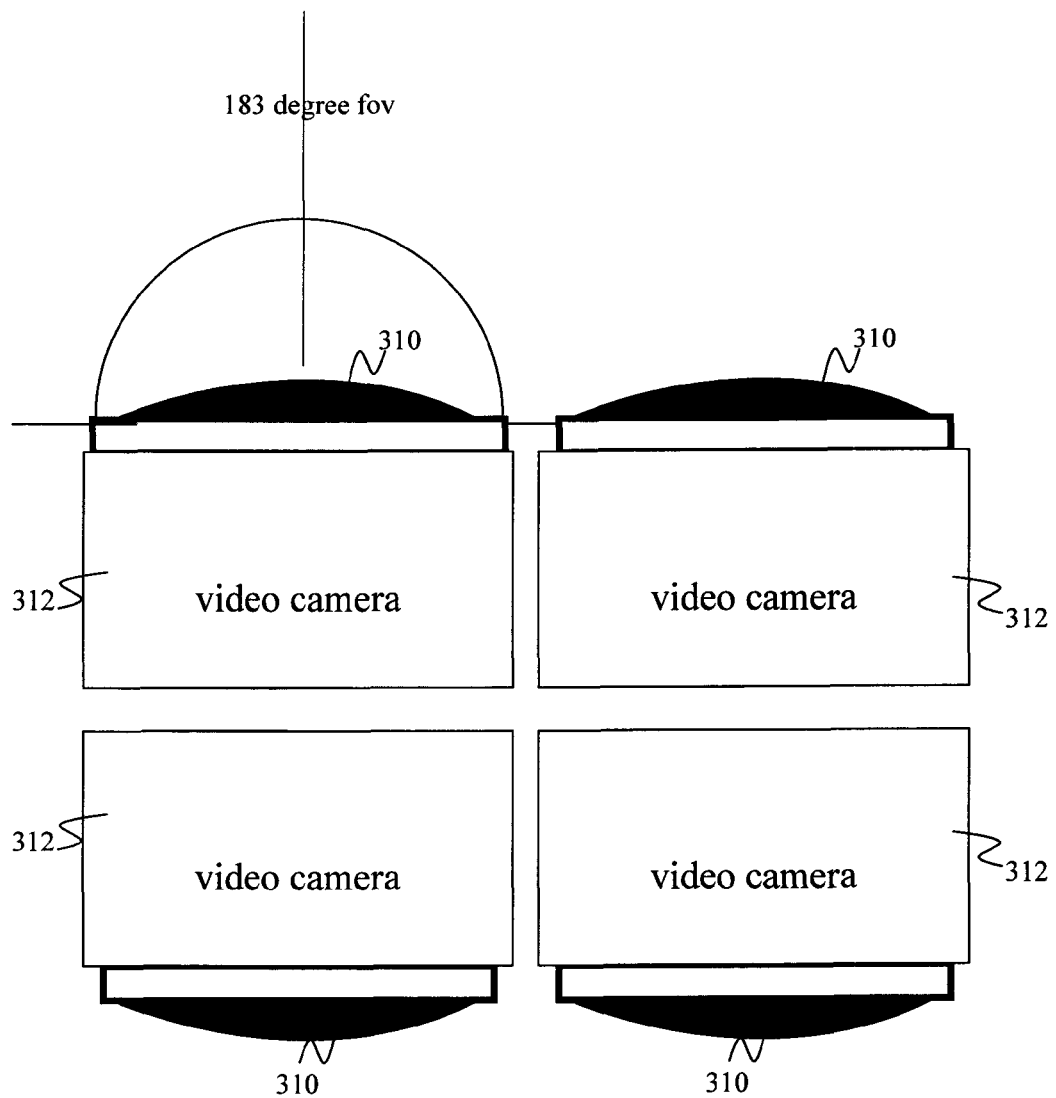
Figure 3D:
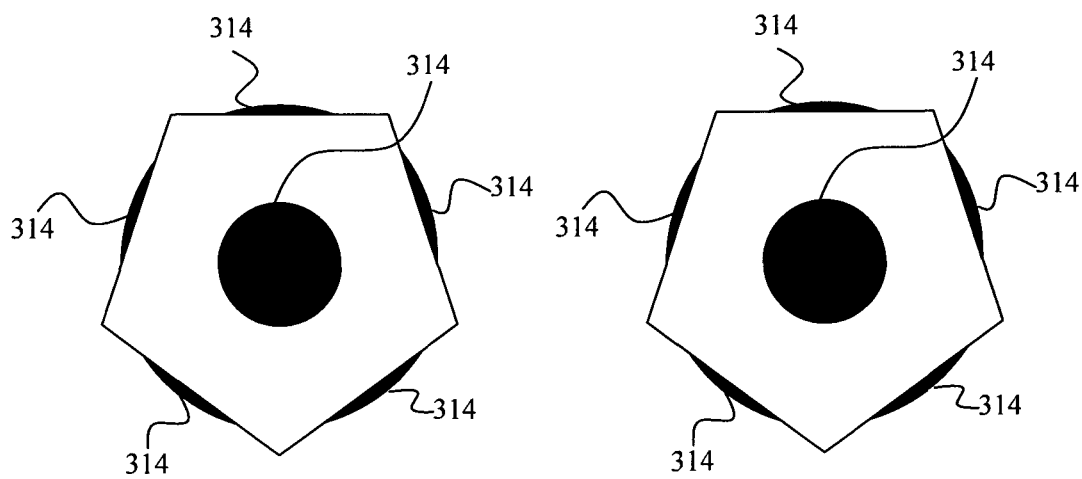

For example, as shown in FIG. 1, an exemplary system in accordance with the present invention may include a wide field of view optical imaging device 100 which may include at least two optical elements 106, 108 each oriented to image different viewpoints of a scene. Respective optical imaging detectors 102, 104 may be associated with each optical element 106, 108. Alternatively, a single imaging detector may be provided and configured to alternately receive images from each of the optical elements 106, 108. The optical elements 106, 108 may include any suitable optical imaging device capable of imaging a wide field of view, such as fisheye lenses, Fresnel lenses, mirror lenses, and catadioptric systems, for example. For instance, the two optical elements 106, 108 may be provided in the form of fisheye lenses which can capture video image data over a field of 180° by 180°. (For example, a 185° lens Raynox® Circular Fisheye Conversion Lens DCR-CF187PRO, Yoshida Industry Co., Ltd. Tokyo, Japan.) Alternatively, the optical elements may be provided in the form of parabolic reflectors 306, 308 and associated detectors 302, 304, FIGS. 3A, 3B. (For example, Pano Pro™ MkIIVB, Pano Pro, Ltd, Watlington, UK.) Further, two pairs of optical imaging detectors with associated optical elements may be used to capture video image data having a wider field of view. For example, a pair of forward facing optical imaging detectors 312 and a pair of rearward facing optical imaging detectors 310 may be employed, FIG. 3C. Still further, five (or four) optical imaging detectors and optical elements 314 maybe spaced equidistant around the circle with an optional sixth optical imaging detector and optical element 314 pointing upward out of the plane of the circle, FIG. 3D.

The optical imaging detectors 102, 104 may record first and second video image data comprising left and right video image streams 2, 4 and may communicate directly with an image renderer 110 to transmit the respective left and right video image streams 2, 4 acquired by the optical imaging detectors 102, 104 to the image renderer 110. Such a configuration in which the optical imaging detectors 102, 104 communication directly with the image renderer 110 may be used for real-time imaging. Alternatively, the optical imaging device 100 may record and store the left and right video image streams 2, 4 for subsequent download to the image renderer 110. For example, the left and right video image streams 2, 4 may be subsequently loaded on to a hard-drive or other suitable storage device to be accessed by the image renderer 110 at a later date.

The image renderer 110 may communicate with a head mounted display 130 (iWear® VR920, Vuzix Corporation, Rochester, N.Y.) worn by a user which may include a tracking device 140 configured to track the movement of the user. A position detector 120 may be disposed in communication with the tracking device 140 to receive tracking data from the tracking device 140 to determine the direction of view of the user. Although the position detector 120 is shown as a separate element in FIG. 1, the position detector 120 may optionally be provided as an integral part of the tracking device 140. (For example, FSRK-USB-1, Hill Crest Labs, Rockville, Md.) The position detector 120 may be disposed in communication with the image renderer 110 to supply the direction of view data to the image renderer 110. By combining knowledge of the direction of view of the user with the left and right video image streams 2, 4, the image renderer 110 may control the rendering and display of selected portions of the left and right video image streams 2, 4 corresponding to the user's direction of view on respective left and right screens 134, 132 of the head mounted display 130 so the user perceives a navigable, panoramic three-dimensional virtual reality environment.

Specifically, the image renderer 110 may take the left and right video image streams 2, 4, and a perform polar to rectangular conversion to merge respective temporally matched image frames of the left and right video image streams 2, 4 into a merged image pair 8. That is, for each image frame of the left video image stream 2 the temporally corresponding image frame of the right video image stream 4 is merged thereto to create a series of merged image pairs 8 for all video frames to provide an output stream of the merged image pairs 8. Merging temporally matched image frames 8 from the left and right video image streams 2, 4 ensures that the video image data from each optical imaging detector 102, 104 remains temporally synchronized, and is but one example of how the image streams 2, 4 may be synchronized. That is, data will always be in sync as the left and right video image streams 2, 4 are now merged together in the output stream. With the left and right video image streams 2, 4 now merged in stereo format in the output stream, the output stream can be processed to play in the head mounted display 130. (In addition, in certain configurations of the optical imaging device 100 it is possible that one optical element 106, 108 may image the other, in which case the image renderer 110 may patch the images of the left and right video image streams 2, 4 to obscure the image of the other optical element.)

To create the head mounted display output, the image renderer 110 may create virtual wireframe spheres 12, 14 (one for each eye) to provide a framework for the virtual reality environment. As each merged image pair 8 is encountered in the output stream, the merged image pair 8 may be split into respective left and right portions that are then wrapped onto respective left, right wireframe sphere 12, 14. The image renderer 110 may virtually place a camera inside the left sphere 14 to create a feed to the left screen 134 of the head mounted display 130 for display to the left eye of the user. Likewise, the image renderer 110 may virtually place a camera inside the right sphere 12 to create a feed to the right screen 132 of the head mounted display 130 for display to the right eye of the user. As these virtual cameras are looking only at a small section of the inside of the virtual spheres 12, 14 the cameras only see part of the image projected around the virtual spheres 12, 14. As the user turns his head anticlockwise a signal is sent back from the tracking device 140 via the position detector 120 to inform the image renderer 110 that the user's head is moving anticlockwise, in response to which the image renderer 110 rotates both spheres 12, 14 clockwise around the spheres' vertical axes. As a result, the virtual cameras inside the virtual spheres 12, 14 will now see an image that pans to the anticlockwise as the cameras are always fixed looking forward, so the inside of the virtual spheres 12, 14 pan clockwise which gives the feeling to the user of movement turning anticlockwise the opposite way.

Turning to FIGS. 2A, 2B, an exemplary process by which the image renderer creates the navigable, panoramic three-dimensional virtual reality environment is illustrated. In one exemplary method in accordance with the present invention, a navigable, panoramic three-dimensional virtual reality environment having ultra-wide field of view may be created using a fisheye stereo side-by-side video publisher for creating the output stream of merged image pairs 8, FIG. 2A, in conjunction with a spherical stereo side-by-side viewer for processing and displaying the output stream to the user, FIG. 2B. Turning first to the publisher, FIG. 2A, the publisher may be implemented using FFMpeg open source libraries for handling multimedia data and Microsoft® DirectX® protocols, though other suitable libraries or algorithms may be used to effect the creation of the output stream of merged image pairs 8. As a first step 200, the video publisher may initialize global variables, which may include initializing the bit rate, frame size, audio channel, and audio rate, as well as selecting the output video stream compression, and output FPS frame rate. (The name of the output video file may also be selected at step 200.) In addition at step 200, the publisher may receive the left and right video image streams 2, 4, with the left video image stream 2 having a plurality of left image frames and the right video image stream 4 having a plurality of right image frames.

After global initialization, publication of the merged image pairs 8 may proceed by creating two parallel publication threads for processing the left and right video image streams 2, 4, at steps 210a and 210b, respectively. Initialization of variables for each publication thread may include initialization of the DirectX® variables: FilterGraph, SampleGrabber, GraphBuilder, IMediaControl, IVideoWindow, IBasicAudio, and IMediaSeek, steps 210a, 210b. In addition, the rendering modes associated with sharpening, brightness, contrast, and noise median may be set, steps 220a, 220b. With the variables initialized and rendering modes set, the left and right video image streams 2, 4 may be processed to remove distortion introduced by the optical imaging device 100 using the transformation provided in Table 1, steps 230a, 230b. The distortion-free streams may then be rendered to respective left and right bitmap streams, steps 240a, 240b, which may then be merged to create the merged image pairs 8 of the output stream, step 250.

TABLE 1

Transformation for each pixel of the current frame:

x_dst, y_dst - destination coordinateQs
x_src, y_src - source coordinates
    distance = FrameHeight * PI
    distance_1 = 1.0 / distance
    distance_2 = distance / 1.1
    phi = x_dst * distance_1
    theta = −y_dst * distance_1 + PI/2
    s = SIN( theta )
    v0 = s * SIN( phi )
    v1 = COS( theta )
    r = SQRT(v1*v1 + v0*v0)
    s = ATAN(r / ( s * COS( phi ))) / r
    x_src = v0 * distance_2 * s
    y_src = v1 * distance_2 * s Having formed the output stream of merged image pairs 8, the image renderer 110 may proceed with transformation of the output stream for display in the head mounted display 130 to create the navigable, panoramic three-dimensional virtual reality environment. Beginning at step 260, the video publisher may be initialized by initializing the DirectX® D3D interfaces (e.g., IDirect3D9, IDirect3DDevice9, IDirect3DVertexBuffer9, and IDirect3DTexture9), FIG. 2B. In addition at step 260, the system may be configured to initialize the DirectShow interface (e.g., FilterGraph, SampleGrabber, GraphBuilder, IMediaControl, IVideoWindow, IBasicAudio, IMediaSeek) as well as common parameters, such as all parameters for the stereo video stream and look-up parameters for left and right eye image buffers. After initialization, rendering may proceed by creating two parallel threads for rendering the output video stream of merged image pairs 8 and operating the tracking device 140, at steps 270 and 290, respectively. Specifically, for the tracking thread, the process may include the steps for initializing the tracking device 140, step 290, and tracking the user's movement using the position detector 140, step 292. Returning to the rendering thread, at step 270 the 3D environment may be initialized by filling quad vertices (D3D), creating the Direct3D interface, creating a D3D device and setting the DirectX D3D display mode, setting a render state for the D3D device, setting light for D3D device, creating a vertex buffer for D3D device, preparing backbuffer flipping, and preparing a D3D scene. Once the 3D environment is initialized, the frame-by-frame process of rendering the video stream may proceed at step 272. Specifically, the process may retrieve a current video frame containing a merged image pair 8 and may split the merged image pairs 8 of the video output stream into respective left and right images for use in a left eye buffer and right eye buffer, step 272. Further, the status of the user's position and direction of view in the parallel tracking thread may be checked and updated. As a next step in creating the navigable, panoramic three-dimensional virtual reality environment, the left and right images generated at step 272 may be wrapped around the virtual spheres 12, 14 using the exemplary code listed in Table 2 in view of the following geometric conventions.

In analytic geometry, a sphere with center $(x_0, y_0, z_0)$ and radius, r, is the locus of all points (x, y, z) such that $(x-x_0)^2+(y-y_0)^2+(z-z_0)^2=r^2$. The points on the sphere with radius r can be parameterized via $x=x_0+r \sin \theta \cos \phi$ $y=y_0+r \sin \theta \sin \phi$ $(0 \le \phi \le 2\pi$ and $0 \le \theta \le \pi)$ $z=z_0+r \cos \theta$.

A sphere of any radius centered at zero is an integral surface of the following differential form x dx+y dy+z dz=0. In Cartesian coordinates (x, y, z) on the sphere and (X, Y) on the plane, the projection and its inverse are given by the formulas $$(X, Y) = \left( \frac{x}{1-z}, \frac{y}{1-z} \right),$$

and $$(x, y, z) = \left( \frac{2X}{1+X^2+Y^2}, \frac{2Y}{1+X^2+Y^2}, \frac{-1+X^2+Y^2}{1+X^2+Y^2} \right).$$

In spherical coordinates $(\phi, \theta)$ on the sphere (with $\phi$ the zenith angle, $0 \le \phi \le \pi$, and $\theta$ the azimuth, $0 \le \theta \le 2\pi$) and polar coordinates $(R, \Theta)$ on the plane, the projection and its inverse are $$(R, \Theta) = \left( \frac{\sin\varphi}{1-\cos\varphi}, \theta \right),$$

$$(\varphi, \theta) = \left( 2\arctan\left(\frac{1}{R}\right), \Theta \right).$$

Here, $\phi$ is understood to have value $\pi$ when R=0. Also, there are many ways to rewrite these formulas using trigonometric identities. In cylindrical coordinates $(r, \theta, z)$ on the sphere and polar coordinates $(R, \Theta)$ on the plane, the projection and its inverse are $$(R, \Theta) = \left( \frac{r}{1-z}, \theta \right),$$

$$(r, \theta, z) = \left( \frac{2R}{1+R^2}, \Theta, \frac{R^2-1}{R^2+1} \right).$$

Having transformed the left and right images from a rectangular to spherical form by wrapping the left and right images around respective spheres 12, 14, further processing can proceed by selecting that portion of the wrapped images for display on each of the left and right eyes of the user, step 276. That is, in response to the user's direction of view as determined at step 292, a region of interest for each of the left and right wrapped images is selected for display in the head mounted display 130, step 276. Specifically, the process may, for example, execute the steps for D3D device render by: preparing the D3D matrix, choosing the left and right regions of interest, and controlling the video stream (play, stop, pause) as well as controlling panning (up, down, left, right, zoom). The left and right regions of interest may then be displayed on the respective left and right displays 134, 132 of the head mounted display 130. In the exemplary DirectX® implementation display may be accomplished by having D3D render left and right image buffers containing the left and right regions of interest to the left and right displays 134, 132 of the head mounted display 130, step 278. After a video frame is thus displayed to each of the left and right displays 134, 132, the process may be repeated for each video frame by sending a signal to the rendered 110 to return to step 272, step 280, to create a navigable, panoramic three-dimensional virtual reality environment having ultra-wide field of view.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

TABLE 2

Simple Transformation:

```
width, height - width and height of the window
Fov - current field of view angle (degrees);
pan, tilt - camera direction point (degrees).
panDest, tiltDest - model coordinates of clicked (x, y) point (degrees).
x, y - screen clicked point coordinates (pixels);
r - panorama model sphere radius;
vx, vy, vz - coordinates of vector from origin to picked point in projection
plane;
vx2, vy2, vz2 - transformed vector of picked point.
function radiansToDegree( radian ) {   return (radian * 180.0) /
3.14159265358979323846264; }
function DegreeToRadians( degree ) {   return (degree / 180.0) *
3.14159265358979323846264; }
input: x, y, Fov, pan, tilt, width, height
output: panDest, tiltDest
r = (sqrt(w*w + h*h) / 2.0) / tan (degreeToRadians(fov/2.0) );
vx = r;
vy = w/2.0 - x;
vz = h/2.0 - y;
pan = degreeToRadians( pan );
tilt = degreeToRadians ( -tilt );
cosp = cos( pan ); sinp = sin( pan );
cost = cos( tilt ); sint = sin( tilt );
vx2 = vx*cost*cosp - vy*sinp + vz*cosp*sint;
vy2 = vx*cost*sinp + vy*cosp + vz*sint*sinp;
vz2 = -vx*sint + vz*cost;
sinDest = vy2 / sqrt(vx2*vx2 + vy2*vy2);
panDest = radinasToDegree( arcsin(sinDest) );
if( vx2 <= 0 && vy2 > 0 )
panDest = 180 - panDest;
else if( vx2 < 0 && vy2 <= 0 )
panDest = -180 - panDest;
sinDest = vz2 / sqrt(vx2*vx2 + vy2*vy2 + vz2*vz2);
tiltDest = radiansToDegree( arcsin(sinDest) );
```

What is claimed is:

1. A system for creating a navigable, panoramic three-dimensional virtual reality environment, comprising:
   a wide field of view optical imaging device having at least two optical imaging elements configured to image at least two different viewpoints of a scene, the imaging device comprising at least one optical imaging detector configured to record first and second video image data of the different viewpoints of the scene, respectively;
   a tracking device configured to track the movement of a user;

a position detector disposed in communication with the tracking device to receive tracking data from the tracking device and configured to determine a direction of view of the user;

an image renderer disposed in communication with the optical imaging device to receive the first and second video image data and disposed in communication with the position detector to receive the direction of view, the image renderer configured to compute respective regions of interest of a portion of the first and second video image data based on the user's direction of view, the rendered comprising a computer usable medium having a non-transitory computer readable program code embodied therein, the computer readable program code adapted to be executed to implement a method for rendering the first and second video image data to create a panoramic three-dimensional virtual reality environment comprising the steps of creating first and second wireframe spheres, and transforming each of the first and second video images by wrapping the first and second video data onto the first and second wireframe spheres respectively; and a head mounted display disposed in communication with the image renderer to receive image data associated with the respective regions of interest and configured to display the image data associated with the respective regions of interest the user, whereby a navigable, panoramic three-dimensional virtual reality environment is created.

2. The system according to claim 1, wherein the center of origin of the first sphere is selected to correspond to a location within the head mounted display at which one of the user's eyes is to be positioned.

3. The system according to claim 2, wherein the center of origin of the second sphere is selected to correspond to a location within the head mounted display at which the other of the user's eyes is to be positioned.

4. The system according to claim 1, wherein the regions of interest each comprise a respective portion of the first and second spheres.

5. The system according to claim 1, wherein the optical imaging device comprises a fisheye lens.

6. The system according to claim 1, wherein the optical imaging device comprises a mirror.

7. The system according to claim 1, wherein the optical imaging device is configured to alternately display the images of the at least two different view points on the optical imaging detector to provide the first and second video image data.

8. A non-transitory computer usable medium comprising a computer readable program code embodied therein, the computer readable program code adapted to be executed to implement a method for rendering video image data to create a navigable, panoramic three-dimensional virtual reality environment comprising the steps of:

receiving video image data of a scene having a wide field of view comprising first and second video image streams taken from different viewpoints, the first video image stream having a plurality of first image frames and the second video image stream having a plurality of second image frames;

synchronizing respective pairs of the first and second image frames to create a video output stream of the synchronized image pairs;

creating first and second wireframe spheres, and wrapping respective first and second sections of the synchronized image pairs onto the first and second wireframe spheres respectively;

receiving position data indicating a direction of sight of a user;

calculating a first and second region of interest of the respective first and second image frames based on the position data; and displaying the first and second regions of interest on a stereoscopic display, whereby a navigable, panoramic three-dimensional virtual reality environment is created.

9. A non-transitory computer usable medium comprising a computer readable program code adapted to be executed to implement a method for rendering the first and second video image data to create a navigable, panoramic three-dimensional virtual reality environment according to claim 8, wherein the step of synchronizing respective pairs of the first and second image frames comprises merging respective pairs of the first and second image frames to create the video output stream.

10. A non-transitory computer usable medium comprising a computer readable program code adapted to be executed to implement a method for rendering the first and second video image data to create a navigable three-dimensional virtual reality environment according to claim 8, wherein the step of displaying the first and second regions of interest comprises rotating the first and second wireframe spheres in response to the position data.

11. A non-transitory computer usable medium comprising a computer readable program code adapted to be executed to implement a method for rendering the first and second video image data to create a navigable three-dimensional virtual reality environment according to claim 8, comprising removing distortion from the first and second image frames.

12. A non-transitory computer usable medium comprising a computer readable program code adapted to be executed to implement a method for rendering the first and second video image data to create a navigable, panoramic three-dimensional virtual reality environment according to claim 8, wherein the step of synchronizing respective pairs of the first and second image frames comprises converting the first and second image frames to rectangular merged images.

13. The system according to claim 1, wherein the at least one optical imaging detector comprises a pair of optical detectors facing in the same direction.

14. The system according to claim 1, wherein the at least one optical imaging detector comprises a pair of forward facing optical imaging detectors and a pair of rearward facing optical imaging detectors.

* * * * *